(No Model.)
E. MILLER.
HARROW.
No. 402,607. Patented May 7, 1889.
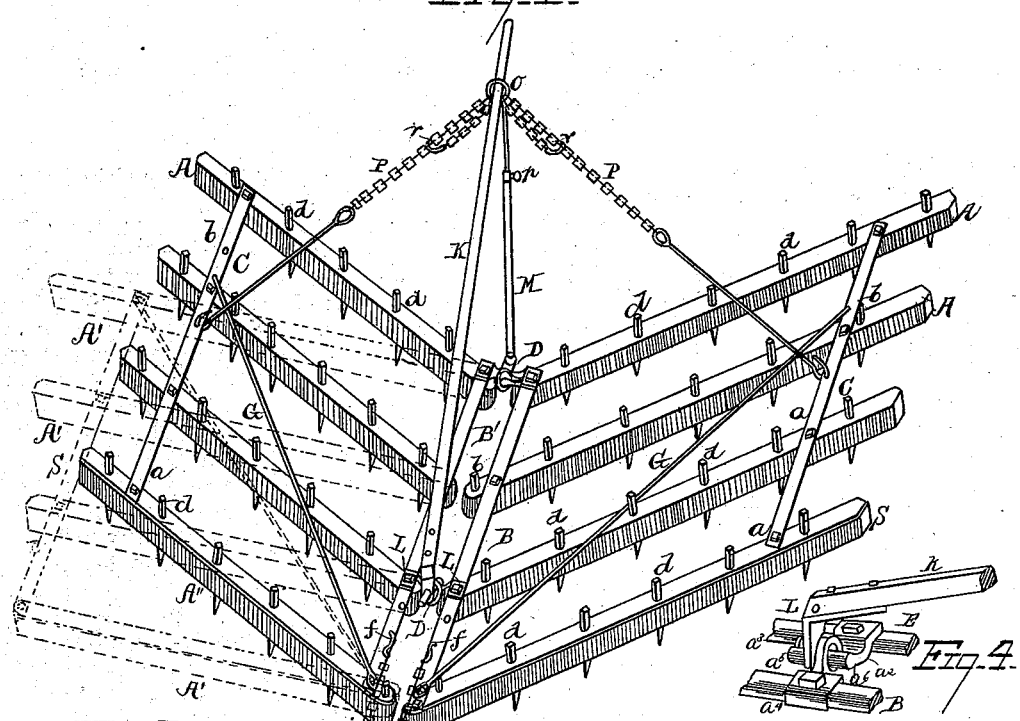
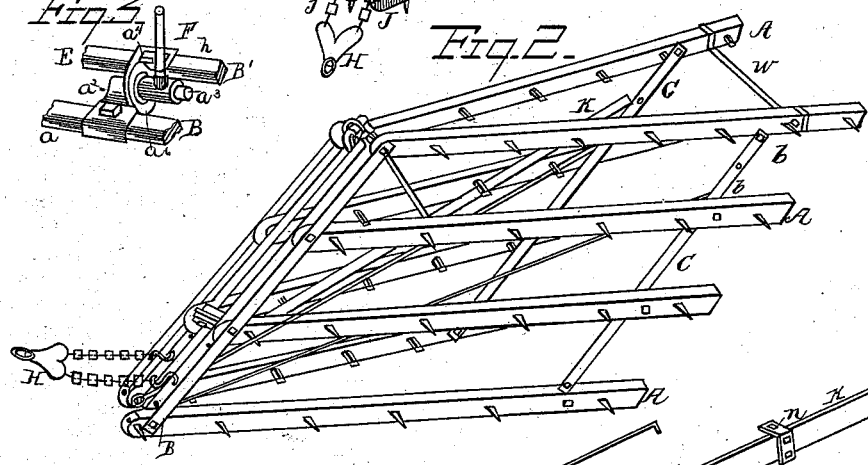
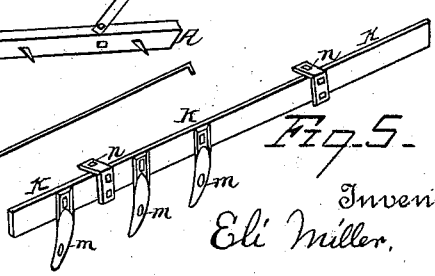
Witnesses,
Albert Popkins
E. Steward
Inventor,
Eli Miller.
By his Attorney W. K. Miller

UNITED STATES PATENT OFFICE.

ELI MILLER, OF CANTON, OHIO.

HARROW.

SPECIFICATION forming part of Letters Patent No. 402,607, dated May 7, 1889.

Application filed March 7, 1887. Serial No. 230,056. (No model.)

*To all whom it may concern:*

Be it known that I, ELI MILLER, a citizen of the United States, and a resident of Canton, county of Stark, State of Ohio, have invented a new and useful Improvement in Harrows, of which the following is a full, clear, and exact description, reference being had to the accompanying drawings, making part of this specification.

My invention relates to improvements in harrows; and it consists of the hereinafter-described parts and combination of parts, as set forth in the claims.

Similar letters of reference indicate corresponding parts in all of the figures of the accompanying drawings.

Figure 1 is a view in perspective of a harrow embodying my improvements. Fig. 2 is a view in perspective of the harrow folded, that it may be drawn upon the highway or from field to field, as occasion may require. Fig. 3 is a view in perspective of the rear hinge by which the rear ends of the two sections of the harrow are united, also showing the pivotal connection of the vertical support for the controlling handle or lever. Fig. 4 is a view in perspective of the front hinge, showing the manner of connecting the front end of handle. Fig. 5 is a view in perspective of a cultivator attachment hereinafter explained. Fig. 6 is a detached view of the coupling-rod.

Letters A A' represent the harrow-frame timber, and B B' the draft-bars. The timbers A and A' have a pivotal connection with the bars B, as shown, by the use of the bolts $a$, and are substantially similar in form and connection, and may be of such length and dimension as may be required or preferred, and have any desired number of teeth. Preferably I make the timbers A' longer than those designated A, the additional length projected inside of the bar B, so as to receive and hold a tooth, $d'$, as shown in Fig. 1. The teeth $d$ may be of any of the usual and approved forms.

The two sections of the harrow are hinged together, as shown in Fig. 1, by the hinge D, formed of two parts, E and F, the part E having a body adapted to be connected to bar B by a bolt, and having a projected neck, $a^2$, from which there is projected a pin, $a^3$. Part F has a body, $a^4$, adapted to be bolted to bar B, and has projected therefrom a vertical flange, $a^5$, having therein a vertical slot, $a^6$, hereinafter explained.

Bar C is provided with a series of perforations, $b$, a coupling-rod, G, having an eye, $b'$, turned on one of its ends, by which it is attached to the front inner corner of the harrow, the other end having a hook, $b^2$, said hook adapted to be dropped into the perforations $b$, and by which each wing or section of the harrow may be held in a more or less contracted or expanded position, as shown by the dotted lines in Fig. 1, the rod having been placed in the rear perforation of the bar C. By these means the harrow or either section thereof may be contracted quickly to pass obstruction, or the width of the implement may be fixed at such width as may be best adapted to the work to be done, the two sections hinged together, as hereinbefore stated, having a central point of draft, H, from which chains S extend to draft-hooks $f$. A vertical movement of the inner end of the sections of the harrow is provided for by the peculiar construction of the hinge, the flange $a^5$ and slot $a^6$ having the pivotal pin $a^3$ passed through said slot, by which the two sections of the harrow are held in position, and yet the inner end of each section is free to rise and fall to adapt itself to the undulation of the ground.

The handle-lever R is provided to assist the operator in handling the harrow. The front end of said handle has a pivotal connection, L, with the hinge-pin $a^3$, as shown. The rear end is supported by an adjustable vertical support, M, the lower end pivoted about the pivotal pin $a^3$ of the rear hinge, as shown. Said support may be made of the ordinary gas-pipe cut into the desired length, and having on each of its ends a T-coupling, $h$, used substantially as shown in the drawings, Figs. 1 and 3. The adjusting-section N, having on its upper end a ring, O, that embraces the handle R, is passed into the pipe-section M, and may be fixed at the desired point of adjustment by the use of the screw $p$. Chains P are provided, as shown, having one end connected to the ring O, the other by a hook to the bar C. In changing the harrow from one width to another the length of the chains may be adjusted to such width by drawing the chain through the ring O and placing the hook $r$ in such a link as will fix the length as desired. Both chains should be slacked to allow the harrow to adapt itself to uneven ground. By the use of said handle R either section of the harrow may be raised by vibrating said handle to the right or the left, so as to free the harrow from accumulated grass or weeds, or for passing stumps or other obstructions.

A cultivator attachment, as shown in Fig. 5, is provided and may be constructed in the following manner: A metal bar, K, of such length and dimensions as may be required for a given size of harrow having shanks $k$ attached thereto for the support of cultivator-hoes $m$, and a clevis, $n$, attached to the frame-piece A by placing the timber A' between the prongs of the clevis, and having the holes in said clevis behind the timber, and passing a bolt down through the clevis and behind the timber, thus securely holding the cultivator to the harrow. The hoe-supporting shanks $k$ may be attached to the bar K at such intervals as may be desired for the breaking of hard ground or for hoeing or cultivating growing plants.

On the front edge of front timbers, A, there is provided a metal shoe, S, extending from a point embracing the front end to the outer end, as shown, upon which the harrow may be drawn from field to field or on the highway. In Fig. 2 is shown a link, $w$, that may be dropped over the timbers to secure the harrow when folded.

For convenience in packing for transportation or storing, the linchpins may be removed from the ends of the hinge-pins, the hooks $b^2$ lifted out of the bars C, and the frames separated and closed together.

Having thus fully described the nature and object of my invention, what I claim, and desire to secure by Letters Patent, is—

1. The combination, with a harrow composed of two sections, of a hand-lever, the front end of which is supported by the pivotal pin of the front hinge, the rear end supported by an upright support that is adjustable vertically, and chains connecting said hand-lever to the outer edge of the harrow, substantially as described, and for the purpose set forth.

2. The combination, with a harrow composed of two sections hinged together, of a vertically-adjustable handle-support, the lower end of said support having a pivotal connection with the harrow-hinge, substantially as described, and for the purpose set forth.

In testimony whereof I have hereunto set my hand this 2d day of March, A. D. 1887.

ELI MILLER.

Witnesses:
CHAS. R. MILLER,
W. K. MILLER.